July 3, 1962 R. Y. PARADISE ET AL 3,042,911

DIGITAL TO ANALOG CONVERTER

Filed Jan. 15, 1960 2 Sheets-Sheet 1

RONALD Y. PARADISE
BOB N. NAYDAN
INVENTORS

BY Andrew L. Bain
George B. Oujevolk
ATTORNEYS

July 3, 1962 R. Y. PARADISE ET AL 3,042,911

DIGITAL TO ANALOG CONVERTER

Filed Jan. 15, 1960 2 Sheets-Sheet 2

RONALD Y. PARADISE
BOB N. NAYDAN
INVENTORS

BY Andrew L. Bain
George B. Oujevolk

ATTORNEYS

United States Patent Office 3,042,911
Patented July 3, 1962

3,042,911

DIGITAL TO ANALOG CONVERTER

Ronald Y. Paradise, Hillsdale, and Bob N. Naydan, Passaic, N.J., assignors to General Precision, Inc., Little Falls, N.J., a corporation of Delaware Filed Jan. 15, 1960, Ser. No. 2,670
7 Claims. (Cl. 340—347)

Figure 1:
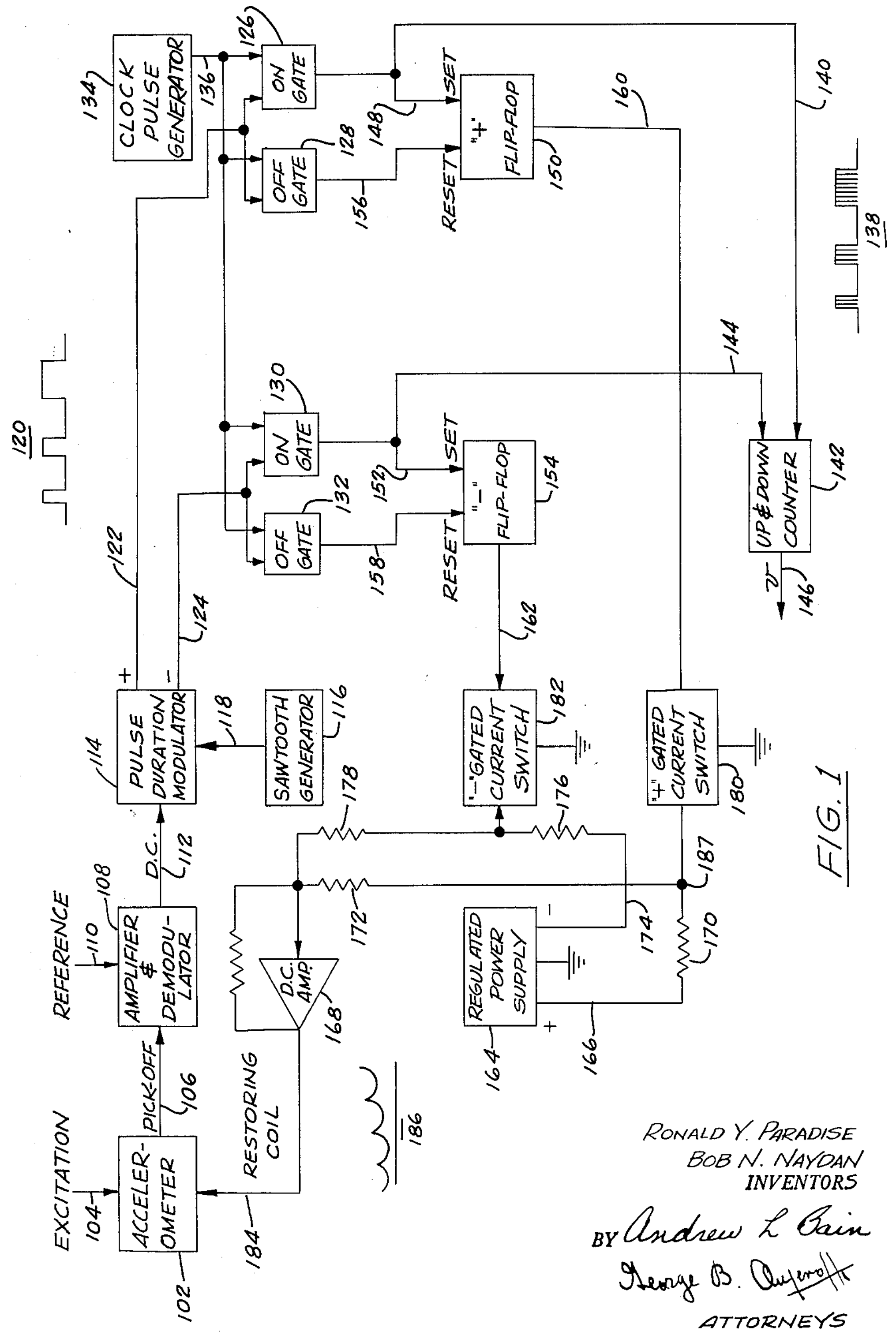

The present invention relates to gating circuits and more particularly to gating circuits used in digital to analog converter means.

It is well known that in certain computer systems a binary representation of a variable obtained from a digital computer is converted into a proportional voltage suitable for use in a D.C. analog computer. Furthermore in the field of automatic control, it is often desired to derive an output which bears a functional relationship with the magnitude of a measured physical quantity. By and large, sensing means for measuring the magnitude of a physical quantity are analog devices. However, the computing means for deriving secondary data from the sensed information are often digital devices. Thus, it is often necessary to insert analog to digital converter means between the sensing means and the computer means.

It is extremely important that such analog to digital converter means be highly accurate and reliable so that a minimum of error is introduced. However, due to noise or other causes, an analog to digital converter, which normally has a pulse output, may introduce a spurious pulse or suppress an information pulse, so that error is introduced into the overall system. In certain analog sensing means, such as an accelerometer, a restoring force proportional to the output thereof is fed back thereto through a feedback loop, i.e., the analog to digital conversion means has associated therewith, digital to analog feedback conversion means.

The present invention is concerned with such digital to analog conversion means either alone, or in a feedback loop. In fact, the present invention has special utility in a feedback loop of an analog to digital converter means used for converting the analog output information of sensing means to digital information in pulse form, which analog to digital converter means has associated therewith a feedback loop, i.e., digital to analog converter means responsive to the digital information for obtaining an analog output which is fed back as an input to the sensing means. In fact, the invention will be herein explained with emphasis on this particular embodiment, it being well understood by those skilled in the art that the invention may of course, also be used generally in the radar, television, telemetering, pulse-code communication and computing fields.

Should an analog to digital converter means, due to noise or other cause, introduce a spurious pulse, the feedback input to the sensing means will be greater than it should be, which will result in reducing the output therefrom below that which would have been obtained if there had been no spurious pulse. Thus, over a period of time the erroneous information supplied by the spurious pulse will be compensated. In a similiar manner, the lower feedback caused by the suppression of an information pulse will result in increasing the output from the sensing means above that which would have been obtained had the information pulse not been suppressed. Thus, over a period of time, the erroneous information caused by the absence of an information pulse will also be compensated.

The general principle of operation of the digital to analog feedback herein before mentioned is similar to a digital to analog converter which is known in the art. Thus, whenever an input appears, a corresponding relay is energized allowing a current weighted in proportion to the significance of the input to enter the feedback amplifier. The amplifier will sum up a plurality of such inputs to produce a proportional D.C. voltage output. Originally such relays consisted of mechanical switches. Such switches are obviously not suited for high speed operation. Transistors are preferred for such use, and the use of transistors in gating circuits has been described in Department of the Army Technical Manual TM 11-690, Basic Theory and Application of Transistors, March 1959, pages 210 to 219. However, whereas in a switch, perfect operation is attainable for on and off positions, this is not so in transistors. Transistors are subject to leakage, thus, the open end short circuit positions on the transistor do not give precisely the same effect as the open and short circuit position of a switch. Furthermore, it is difficult to compensate for the transistor difficulties over a wide temperature range, and certain computer devices are employed in temperatures ranging from −55° C. to +75° C.

Although many attempts were made to overcome the foregoing difficulties and other disadvantages when using transistors in the place of switches, none, as far as we are aware was entirely successful when carried into practice commercially on an industrial scale.

It has now been discovered that a gating circuit can be provided for a digital to analog converter component which is vastly superior to such circuits which are presently used, and which can be used over a wide temperature range.

It is therefore an object of this invention to provide a transistor gating circuit, particularly useful over a wide temperature range.

It is another object of this invention to provide an improved digital to analog converter means.

It is a further object of this invention to incorporate digital to analog converter means in a feedback loop of an analog to digital conversion means.

Figure 2:
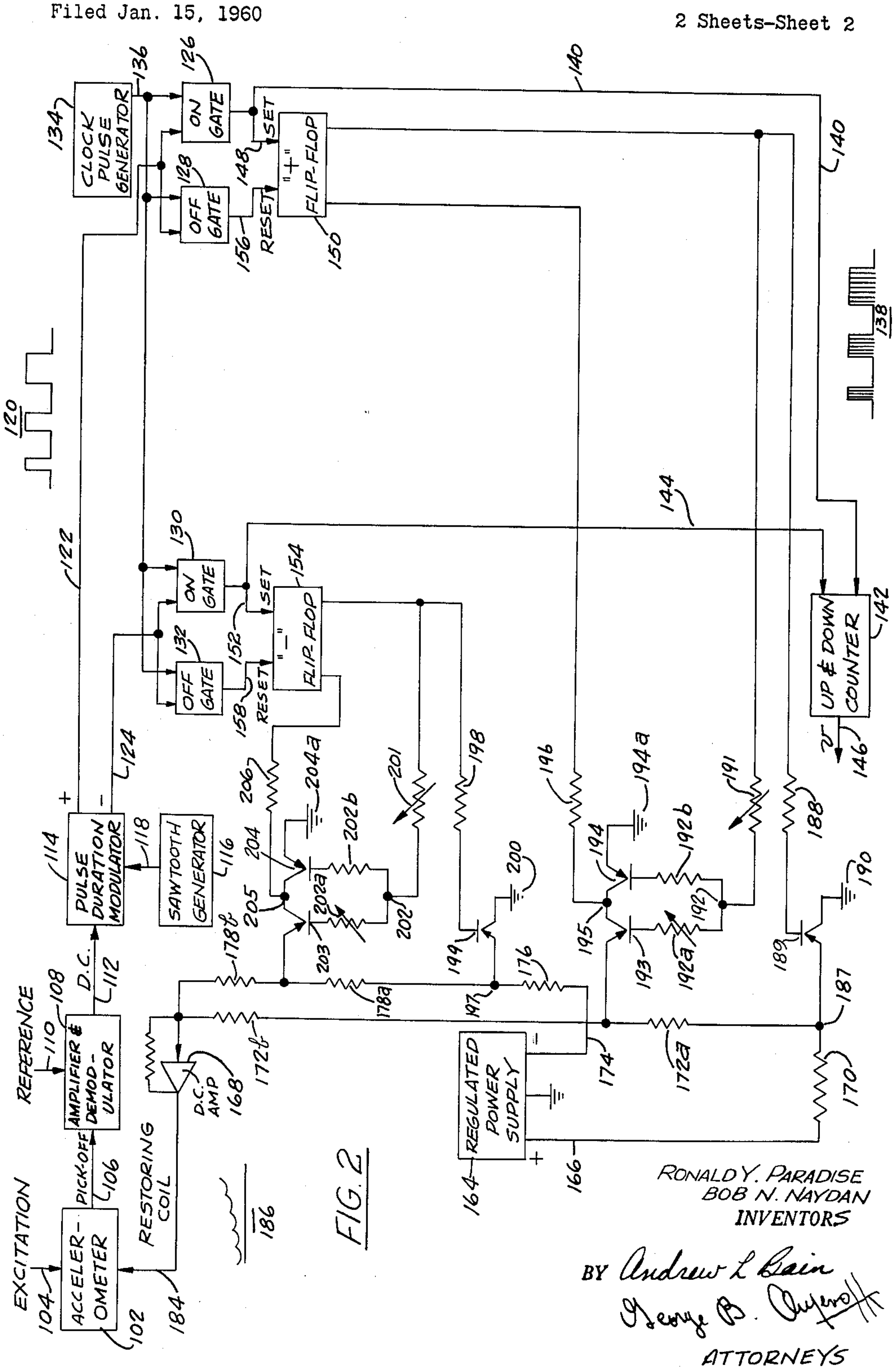

These and other objects, features and advantages of the present invention will become apparent from the following detailed description taken together with the accompanying drawing in which:

FIGURE 1 is a block and schematic diagram of a device utilizing analog to digital conversion means and having a digital to analog feedback loop; FIGURE 2 depicts the invention contemplated herein as used in the device depicted in FIGURE 1.

Referring now to the drawing, accelerometer 102 has an A.C. excitation input 104 applied thereto from a source (not shown). In response to an acceleration, an A.C. output signal 106 having an amplitude and phase proportional to the magnitude and direction of acceleration is picked off accelerometer 102 and applied as a first input to amplifier and demodulator 108. An A.C. reference input 110 is applied as a second input to amplifier and demodulator 108 from a source (not shown). Amplifier and demodulator 108 may include lead-lag networks for loop stabilization purposes.

Amplifier and demodulator 108 provides a D.C. output 112 having a magnitude proportional to the magnitude of the acceleration sensed by accelerometer 102 and a polarity determined by the duration of acceleration, i.e., positive for acceleration and negative for deceleration.

D.C. output 112 is applied as a first input to pulse duration modulator 114. Sawtooth generator 116 provides a periodic sawtooth wave output 118 at a relatively low frequency, such as 2 kc. for instance, which is applied as a second input to pulse duration modulator 114.

Pulse duration modulator 114 is any means well known in the art for producing a pulse having a width or duration in accordance with the magnitude of a D.C. input applied thereto. More specifically, pulse duration modulator 114 may, for example, include means for summing D.C. output 112 and sawtooth wave output 114 and controlling a switching device by the zero crossings of the resultant wave forms. In responses to D.C. output 112 having a positive polarity, pulse duration modulated pulses, such as indicated by reference numeral 120, are derived on first output means 122 of pulse duration modulator 114. In response to D.C. output 112 having a negative polarity, pulse duration modulated pulses are derived on second output means 124 of pulse duration modulator 114.

Pulse duration modulator 114 is biased such that, in response to the magnitude of D.C. output 112 being zero, narrow pulse duration modulated pulses of equal duration are derived on both first and second output means 122 and 124. In response to D.C. output 112 having a positive magnitude, the pulse duration modulated pulse derived on second output means 124 narrows still further, so that when the positive magnitude of D.C. output 112 reaches a small positive threshold value the pulse modulated pulse on second output means 124 is eliminated altogether. In a similar manner, the pulse modulated pulse on first output means 122 is eliminated altogether when the negative magnitude of D.C. output 112 reaches a small negative threshold value.

The pulse duration modulated pulses derived on first output means 122 are applied, as shown as first inputs to on gate 126 and off gate 128, respectively. The pulse duration modulated pulses derived on second output means 124 are applied, as shown, as first inputs to on gate 130 and off gate 132.

Clock pulse generator 134, which may be the clock pulse generator of a digital computer, not shown, utilizing the digital output of the present invention, supplies highly accurate clock pulse output 136 at a relatively high frequency, such as 400 k.c., as a second input to on gate 126, off gate 128, on gate 130 and off gate 132.

On gate 126 is normally off and is gated on only during the duration of a duration modulated pulse from first output means 122. Off gate 128 is normally on and is gated off only during the duration of a duration modulated pulse from first output means 122. On gate 130 is normally off and is gated on only during the duration of a duration modulated pulse from second output means 124. Off gate 132 is normally on and is gated off only during the duration of a duration modulated pulse from second output means 124.

Therefore, on gate 126 passes clock pulses only during the presence of a duration modulated pulse from first output means 122; on gate 130 passes clock pulses only during the presence of a duration modulated pulse from second output means 124; off gate 128 passes clock pulses except during the presence of a duration modulated pulse from first output means 122; and off gate 132 passes clock pulses except during the presence of a duration modulated pulse from second output means 124.

The clock pulses passed by on gate 126 which appear as indicated by reference numeral 138, are applied as an up input 140 to up and down counter 142. The clock pulses passed by on gate 130 are applied as a down input 144 to up and down counter 142.

Up and down counter 142 registers a count which is equal to the difference between the total number of clock pulses applied as an up input 140 thereto and the total number of clock pulses applied as a down input 144 thereto.

Since the velocity is equal to the time integral of acceleration, the count registered by up and down counter 142 expresses velocity to digital form. This registered count is applied as output 148 of up and down counter 142 to utilization means, such as a digital computer, not shown.

The clock pulses passed by on gate 126 are also applied as set input 148 "+" flip-flop 150 and the clock pulses passed by on gate 130 are also applied as set input 152 to "−" flip-flop 154. Flip-flops 150 and 154 may be bistable multivibrators, for example. The clock pulses passed by off gate 128 are applied as reset input 156 to "+" flip-flop 150 and the clock pulses passed by off gate 132 are applied as reset input 158 to "−" flip-flop 154.

In response to the first clock pulse applied to set input 148 of "+" flip-flop 150 during the presence of a duration modulated pulse, "+" flip-flop 150 is switched to its set position. Additional clock pulses applied to set input 148 have no effect since "+" flip-flop 150 is already in its set position. In response to the first clock pulse applied to reset input 156 of "+" flip-flop 150 immediately following the termination of a duration modulated pulse, "+" flip-flop 150 is switched to its reset position. Additional clock pulses applied to reset input 156 have no effect, since "+" flip-flop 150 is already in its reset position.

"+" flip-flop 150 produces an output 160 during the period "+" flip-flop 150 is in its set postion. It will be seen that output 160 will be a pulse having a duration which is an integral multiple of the clock pulse period.

In a similar manner, "−" flip-flop 154 will produce a pulse output 162 which also has a duration which is an integral multiple of the clock pulse period.

Regulated power supply 164 includes a positive output 166 of given magnitude which is applied as an input to D.C. amplifier 168 through resistances 170 and 172 and a negative output 174 of the same given magnitude which is applied as an input to D.C. amplifier 168 through resistances 178 and 176.

It is at this portion of the device described that the circuit herein contemplated is used. The junction of resistances 170 and 172 must be shorted to a point of zero reference potential through normally conducting "+" gated current switch 180, and the junction of resistance 176 and 178 must be shorted to the point of zero reference potential through normally conducting "−" gated current switch 182, so that normally no voltage appears at the input to D.C. amplifier 168. In the devices of the prior art, because of leakage in transistors, this ideal condition was only possible when components 180 and 182, i.e., the "+" and "−" gated current switches, were mechanical type switches. The use of transistors was either not possible under all conditions or less accurate results were obtained by using transistors particularly over a wide temperature range of −55° C., to +75° C.

In the present embodiment however, PNP transistors are advantageously employed in the manner shown in FIGURE 2. Thus "+" gated current switch 180 in series with junction 187 of resistors 170 and 172 is a transistor gating circuit, and the positive output 166 from regulated power supply 164 is directed towards this transistor gating circuit across resistor 170. The other arm of this junction, resistor 172 has been divided into two sections, namely resistors 172*a* and 172*b*. The reasons for this will be more apparent from the explanation of the gating circuit given herein.

Since the junction 187 of resistances 170 and 172, i.e., the junction of resistances 170 and resistances 172*a*+ resistance 172*b* must be shorted to a point of zero reference potential through the gating switch, "+" flip-flop 150 will normally be in the reset position. In this position, a potential is created through resistors 188 and 191 connected to one output of flip-flop 150, and thus, the base of transistor 189 will be negative with respect to its collector, i.e., forward bias is established by flip-flop 150 through resistor 188 on emitter-base junction 189, and current through resistor 170 will be shorted to ground 190. This portion of the circuit is a standard inhibition gate. The bulk of the current will thus be accounted for, leaving only the small transistor leakage current, and it is this small leakage current which introduces the errors.

To handle this leakage current, there is provided in combination with the circuits of transistor 189, transistors 193 and 194 with their collectors in back to back relationship, i.e., the collector of 193 is in series with the collector of 194 across junction 195. The junction of the bases of transistors 193 and 194, i.e., junction 192 is in series with resistor 191, said resistor 191 being in series with said same one output terminal of "+" flip-flop 150 as resistor 188. On the other hand, junction 195 of the collectors of transistors 193 and 194 is in series with the other output terminal of "+" flip-flop 150 across resistor 196 so that in the reset position each base of transistors 193 and 194 is likewise negative with respect to its collector, in this case, forward bias is established by flip-flop 150 through resistor 191 on emitter-base junctions 193 and 194. Thus, any current leakage past junction 187 will be shorted to ground 194*a*. This leaves only the voltage drop of transistors 193 and 194 to be accounted for since in the external circuit, there is an electron flow from emitter to collector. For this reason, transistors 193 and 194 are in back to back relationship as hereinbefore described. By use of these transistors 193 and 194 in such relationship, the equivalent voltage of each can be almost made to cancel. Because of the small amount of current which transistors 193 and 194 will be required to handle, resistor 172 has been divided into two sections, namely resistors 172*a* and 172*b*, section 172*a* having a considerably smaller ohmic value than section 172*b*, usually somewhere of the order of one-fourth the value. In this way, the current can be effectively shorted after only passing through resistance 172*a*. It should be noted that currents flowing through resistances 191 and 196, i.e., the load on the emitter-base junction of the transistors which are in back to back relationship, and the load on the collector junction of said transistors, should be kept equal to within, say 1% in order to prevent a large difference current from flowing through transistor 189 to ground thus causing an appreciable voltage drop across the transistor equivalent series resistance. Therefore, one of these resistances, e.g., resistance 191 may advantageously be adjustable. Likewise, junction 192 of transistor bases 193 and 194 may be connected to said bases by resistors 192*a* and 192*b*, one of which, e.g., 192*a* may advantageously be adjustable.

The transistor circuit for "—" gated current switch 182 is the same as that just described for "+" gated current switch 180. Again, resistor 178 is divided into two sections, namely resistors 178*a* and 178*b*; and junction 197 of resistors 176 and 178*a*+178*b* is directed to the transistor gating circuit used as "—" gated current switch 182. This circuit includes an inhibition gate comprisng transistor 199, forward bias on emitter base junction of transistor 199 being established by one output terminal of "—" flip-flop 154 in series with transistor 199 across resistor 198 so that current through resistor 176 will be shorted to ground 200, flip-flop 154 normally being in the reset position. Any current leakage past junction 197, will after going through resistor 178*a* be shorted to ground 204*a* by means of transistors 203 and 204 in back to back relationship as hereinbefore described for corresponding transistors 193 and 194. The junction of the bases of transistors 203 and 204, i.e., junction 202 is connected to the one output terminal of flip-flop 154 through resistor 201 and junction 205 of the collector of transistors 193 and 194 is in series with the other output terminal of flip-flop 154 across resistor 206 so that in the reset position of the flip-flop each base of transistors 199, 203 and 204 is negative with respect to its collector. In this circuit, resistors 201, and 202*a* are shown as being adjustable. Resistors 202*a* and 202*b* being set between junction 202 and the bases of transistors 203 and 204 in the same manner as resistors 192*a* and 192*b*.

With the flip-flops in the set position, the transistors are all biased positive at their bases and are thus nonconducting. Under the ideal case of zero transistor conduction, the correctly weighted current equal for example, to $$\frac{E_{166}}{R_{170}+R_{172a}+R_{172b}}$$

is fed to the input of the amplifier 168 to produce the corresponding contribution to the analog voltage output. A departure from this ideal situation is present however, because the transistors all have a finite leakage current in the off position. This leakage is the same order of magnitude for the three transistors in the circuit, but the leakage of the two transistors in back to back relationship tend to cancel, thus leaving the first transistor as the major source of error. Calculations show that the average magnitude of the leakage in this circuit for the average PNP transistor is less than 0.001 microampere at 25° C. and 0.030 microampere at 75° C. The corresponding contribution to error is therefore considerably less than .01% in the worst case. Satisfactory performance has been obtained by use of this circuit over a temperature range of from −55° C. to +75° C.

Pulse output 160 is applied as a control input to "+" gated current switch 180, i.e., to transistors 189, 193 and 194 to cut-off the "+" gated current switch during the presence of pulse output 160. This results in a constant amplitude positive pulse derived from output 166 being actually applied to the input of D.C. amplifier 168 during the presence of pulse output 160, and a constant amplitude negative pulse derived from output 174 being actually applied to the input of D.C. amplifier 168 during the presence of pulse output 162 because of "—" gated current switch 182, i.e., to transistors 199, 203 and 204. The constant amplitude positive and negative pulses, although differing in polarity, will be of the same magnitude.

D.C. amplifier 168 is a feedback amplifier which provides a D.C. output 184 which is proportional to the average energy applied as an input thereto. Reference numeral 186 represents a positive D.C. output 184, which may be provided by D.C. amplifier 168. D.C. output 184 is fed back to the restoring coil of accelerometer 102, which applies a restoring force to accelerometer 102 which is proportional to D.C. output 184.

Accelerometer 102 is damped in accordance with the restoring force, so that the amplitude of signal 106 is effectively lowered in accordance with the magnitude of D.C. output 184.

If the described circuit is operating properly, so that the digital information in pulse form emerging from the analog to digital converter correctly manifests the magnitude of A.C. output 106, the magnitude of D.C. output 184 emerging from the digital to analog converter, which manifests in analog form the digital information applied thereto, will be proportional to the magnitude of A.C. output 106. Therefore, the damping provided by the restoring force will be proportional to the magnitude of A.C. output 106.

However, if for any reason, the digital information in pulse form energizing from the analog to digital converter should ever manifest a magnitude greater than the magnitude of A.C. output 106, the magnitude of D.C. output 184 will also be greater than it should be. This will result in greater damping, so that the magnitude of A.C. output 106 will be lowered below the value it would have had if the digital information from the analog to digital converter had manifested the current magnitude of A.C. output 106. Therefore, the succeeding digital information will be lower than it otherwise would be, thereby compensating for the original error.

In a similar manner, the feedback loop will compensate for an error in which the digital information manifests a magnitude smaller than the magnitude of A.C. output 106.

It is to be observed therefore that the present invention provides for a switch circuit for switching on and off the flow of current at a junction point 187 of loads in a circuit, e.g., resistors 170 and 172. The invention provides for the combination of a first PNP transistor 189 the collector of which is grounded. Any leakage past said first junction point will pass over a load 172a to a second junction point where said leakage current will be passed to second and third PNP transistor 193 and 194 with their collectors in back to back relationship, i.e., the collector of 193 is in series with the collector of 194 across junction 195. The junction of the bases of transistors 193 and 194 and the base of transistor 189 are connected to one of the output terminals of the bias supply means by loads, e.g., resistors of about equal resistivity. Junction 195 of the collectors of second and third transistors 193 and 194 is connected to the other output terminal of said bias supply means. The emitter of transistor 194 is grounded. When a negative potential is applied by said bias supply means to said transistor bases so that said bases are negative with respect to their collectors, current from said junction point 187 will be shorted to ground by said first transistor 189. Any current leakage past said first junction point will be shorted to ground through the combination of second and third transistors 193 and 194. And, since, second and third transistors are in back to back relationship, the equivalent voltage of each will be substantially cancelled. The invention may be embodied in a digital to analog converter having a circuit in which a power supply supplies current to sensing means over loads so that a binary representation of a variable in digital form can be converted into a proportional voltage supplied by said power supply so that a current weighted in proportion to the significance to said binary input is allowed to enter said sensing means, the output of which is an analog of the magnitude of the sensed quantity of current. In such a device, the invention serves as switch means acting in combination with said power supply, load and sensing means for controlling the flow of current between said power supply and said sensing means input, said switch means being responsive to the actuation of said binary input. Normally a negative bias is applied by the bias supply means so that no current flows past the junction points. The bias supply means are responsive to the binary input, and as a result of a binary input on said bias supply means, a positive bias is applied to said transistor bases so that a current weighted in proportion to the significance to said binary input will then be applied to said sensing means.

The invention has particular utility when stability is required over a wide temperature range, e.g., −55° C. to +75° C. and in this connection, has been incorporated in the digital to analog feedback loop of an analog to digital converter. In this particular device, the analog to digital converter includes a clock pulse generator 134 and a pulse duration modulator 114 which modulates said generator in response to the output of sensing means, e.g., accelerometer 102, the output of said sensing means being an analog of the magnitude of a sensed physical quantity. Responsive means are provided responsive to the output of said sensing means for deriving a duration modulated pulse having a duration in accordance with the magnitude of said sensed physical quantity. Associated with said responsive means are first output means 122 from which a duration modulated pulse is derived in response to the magnitude of said sensed physical quantity being positive, and second output means 124, from which a duration modulated pulse is derived in response to the magnitude of said sensed physical quantity being negative. Coupled to said first and second outputs 122 and 124 are first and second gate means 126 and 130 for passing clock pulses only during the duration of a duration modulated pulse from said first and second output means. Likewise coupled to said first and second output means 122 and 124 are second and third gate means 128 and 132 for passing clock pulses except during the duration of a duration modulated pulse from said first and second output means. Said first and third gate means 126 and 128 and said second and fourth gate means 130 and 132 are each connected to a flip-flop, the output of said first and second gate means being applied as the set input to said flip flops 150 and 154, the output of said third and fourth gate means being applied as the reset input to said flip-flops. The feedback power comes from a regulated power supply 164 with positive and negative polarity outputs 166 and 174. First and second junction points are associated with both said positive and negative polarity outputs. Associated with said first and second junction points for each polarity output are a set of first, second and third PNP transistors hereinbefore described, one set of transistors being controlled by one of the flip-flops so as to apply one polarity output of said feedback power supply as an input to a D.C. amplifier associated with said sensing means, only when said flip-flop is in its set position, and the second set of transistors controlled by the other flip-flop so as to apply the other polarity output of said feedback power supply as an input to said D.C. amplifier only when said other flip-flop is in its set position.

Some of the features of the feedback loop just described will be found in United States patent application Serial No. 839,010, filed September 9, 1959, now Patent No. 3,028,550 of which the present patent application is a continuation-in-part.

Although only a preferred embodiment of the present invention has been described herein, it is not intended that the invention be restricted thereto, but that it be limited only by the true spirit and scope of the appended claims.

We claim:

1. A switch circuit for switching on and off the flow of current at a first junction point of loads in a circuit, comprising, in combination; a first PNP transistor, including an emitter in series with said first junction point; a collector for said first transistor which is grounded; a base for said first transistor; a load past said first junction point of such resistivity as to pass any leakage current of said first transistor; a second junction point, past said last mentioned load; a second PNP transistor including an emitter in series with said second junction point; a collector for said second transistor; a third PNP transistor including a collector therefor, connected to the collector of said second transistor through a collector junction point; a base for said second transistor, a base for said third transistor, said bases being connected through a base junction point; bias supply means adapted to give either a positive or negative bias output from opposed terminals; connecting means including a transistor base load, connecting one of said terminals to the base of said first transistor; connecting means including a second transistor base load connecting said same one terminal to the junction of the bases of said second and third transistors, both of said transistor base loads being almost of equal resistivity; connecting means including a load connecting the other of said opposed terminals to the junction of the collectors of said second and third transistors; and, an emitter for said third transistor which is grounded.

2. A switch circuit for switching on and off the flow of current at a first junction point of loads in a circuit, comprising, in combination; a first PNP transistor, including an emitter in series with said first junction point; a collector for said first transistor which is grounded; a base for said first transistor; a load past said first junction point of such resistivity as to pass any leakage current of said first transistor; a second junction point, past said last mentioned load; a second PNP transistor including an emitter in series with said second junction point; a collector for said second transistor; a third PNP transistor including a collector therefor, connected to the collector of said second transistor through a collector junction point; a base for said second transistor, a base for said third transistor, said bases being connected through a base junction point; voltage supply means adapted to give either a positive or negative voltage output from opposed terminals; connecting means including a transistor base load, connecting one of said terminals to the base of said first transistor; connecting means including a second transistor base load connecting said same one terminal to the junction of the bases of said second and third transistors, both of said transistor base loads being of equal resistivity; connecting means including a load connecting the other of said opposed terminals to the junction of the collectors of said second and third transistors; and, an emitter for said third transistor which is grounded; whereby, when a negative potential is applied by said voltage supply means to said transistor bases so that said bases are negative with respect to their collectors, current from said first junction point will be shorted to ground by said first transistor, and, any current leakage at said first junction point over the load past said junction point will be shorted to ground through the combination of said second and third transistors, said second and third transistors being in back to back relationship, the equivalent voltage of each being substantially cancelled.

3. In a digital to analog converter having a circuit in which a power supply supplies current to sensing means over loads, wherein a binary representation of a variable in digital form is converted into a proportional voltage supplied by said power supply so that a current weighted in proportion to the significance to said binary input is allowed to enter said sensing means, the output of which is an analog of the magnitude of the sensed quantity of current, switch means, in combination with said power supply, load and sensing means for controlling the flow of current between said power supply and said sensing means input, responsive to the actuation of said binary input, comprising a first junction point of loads in said circuit; a first PNP transistor, including an emitter in series with said first junction point; a collector for said first transistor which is grounded; a base for said first transistor; a load past said first junction point of such resistivity as to pass any leakage current of said first transistor; a second junction point, past said last mentioned load; a second PNP transistor including an emitter in series with said second junction point; a collector for said second transistor; a third PNP transistor including a collector therefor, connected to the collector of said second transistor through a collector junction point; a base for said second transistor, a base for said third transistor, said bases being connected through a base junction point; bias supply means responsive to said binary input adapted to give either a positive or negative bias output from opposed terminals; connecting means including a transistor base load, connecting one of said terminals to the base of said first transistor; connecting means including a second transistor base load connecting said same one terminal to the junction of the bases of said second and third transistors, both of said transistor base loads being of equal resistivity; connecting means including a load connecting the other of said opposed terminals to the junction of the collectors of said second and third transistors; and, an emitter for said third transistor which is grounded whereby, when as a result of said binary input on said bias supply means, a negative bias is applied by said bias supply means to said transistor bases so that said bases are negative with respect to their collectors, current from said first junction point will be shorted to ground by said first transistor, and, any current leakage at said first junction point over the load past said junction point will be shorted to ground through the combination of said second and third transistors, said second and third transistors being in back to back relationship, the equivalent voltage of each being substantially cancelled, so that no current will be supplied to said sensing means; but, when as a result of said binary input on said bias supply means, a positive bias is applied by said bias supply means to said transistor bases, a current weighted in proportion to the significance of said binary input will be applied to said sensing means.

4. A device as claimed in claim 3, wherein said bias supply means responsive to said binary input is a flip-flop.

5. A device as claimed in claim 4, said flip-flop and the bases of said transistors being so connected that negative bias will be supplied said bases when said flip-flop is in the reset position, said flip-flop normally being in said reset position except when actuated by an input of a significance which it is desired to have sensed and weighted by said sensing means.

6. In combination; sensing means for producing an output which is an analog of the magnitude of a sensed physical quantity; a clock pulse generator; a pulse duration modulator responsive to said sensing means for modulating said clock pulse generator in accordance with the output of said sensing means, the output of said sensing means being converted into a duration modulated pulse having a duration in accordance with the magnitude of said sensed physical quantity in digital form; utilization means, responsive to digital information applied thereto; means for applying said converted output in digital form as an input to said utilization means; a regulated feedback power supply for initiating a constant amplitude feedback pulse; a D.C. amplifier for deriving a D.C. output proportional to the energy contained in said feedback pulse when applied as an input thereto; means for feeding back the D.C. output of said D.C. amplifier as an input to said sensing means; a first junction point between said feedback power supply and said D.C. amplifier; a first PNP transistor, including an emitter in series with said junction point; a collector for said first transistor which is grounded; a base for said first transistor; a load past said first junction point of such resistivity as to pass any leakage current of said first transistor; a second junction point, past said load; a second PNP transistor including an emitter in series with said second junction point; a collector for said second transistor; a third PNP transistor, the emitter of which is grounded, including a collector for said third PNP transistor, connected to the collector of said second transistor through a collector junction point; a base for said second transistor, a base for said third transistor, said bases being connected through a base junction point; a gate circuit responsive to said clock pulse duration adapted to supply either a positive or negative bias from opposed terminals depending on whether or not said gate circuit is actuated by said clock pulse; connecting means, including a transistor base load, connecting one of said terminals to the base of said first transistor; connecting means including a second transistor base load connecting said same one terminal to the junction of the bases of said second and third transistors, both of said transistor base loads being of equal resistivity; connecting means including a load connecting the other of said opposed terminals to the junction of the collectors of said second and third transistors; both of said connecting means being so arranged that normally a negative bias is supplied by said gate circuit to said transistor bases so that said transistor bases are normally negative with respect to their collector, the pulse from said feedback power supply to said first junction point being normally shorted to ground by said first transistor, and, any current leakage past said first junction point over the load past said junction point being shorted to ground through the back to back second and third transistors, the equivalent voltage of said second and third transistors being cancelled by said back to back relationship, said feedback pulse from said feedback power supply passing to said D.C. amplifier only when said gate supplies positive bias to said transistor bases in response to said clock pulse duration.

7. The combination claimed in claim 6 having responsive means responsive to the output of said sensing means for deriving a duration modulated pulse having a duration in accordance with the magnitude of said sensed physical quantity, first output means associated with said responsive means from which a duration modulated pulse is derived in response to the magnitude of said sensed physical quantity being positive; second output means associated with said responsive means from which a duration modulated pulse is derived in response to the magnitude of said sensed physical quantity being negative; first gate means coupled to said first output means for passing clock pulses only during the duration of a duration modulated pulse from said first output means, second gate means coupled to said second output means for passing clock pulses only during the duration of a duration modulated pulse from said second output means, third gate means coupled to said first output means for passing clock pulses except during the duration of a duration modulated pulse from said first output means; and fourth gate means coupled to said second output means for passing clock pulses except during the duration of a duration modulated pulse from said second output means; first and second flip-flops, the circuit between said first and third gate means and one flip-flop, and the circuit between the second and fourth gate means and the other flip-flop each constituting a gating circuit; means for applying the output of said first gate means as a set input to said first flip-flop to switch said first flip-flop to a set position, means for applying the output of said third gate means as a reset input to said first flip-flop to switch a said first flip-flop to a reset position; means for applying the output of said second gate means as a set input to said second flip-flop to switch said second flip-flop to a set position; means for applying the output of said fourth gate means as a reset input to said second flip-flop to switch said second flip-flop to a reset position; positive and negative polarity outputs on said regulated feedback power supply; first and second junction points associated with both said positive and said negative polarity outputs; a first set and second set of first, second and third PNP transistors, said first set being associated with the first and second junction points associated with said positive polarity output, said second set being associated with the first and second junction points associated with said negative polarity output, said first set of transistors being controlled by said first flip-flop for applying one polarity output of said feedback power supply as an input to said D.C. amplifier only when said first flip-flop is in its set position, and said second set of transistors being controlled by said second flip-flop for applying the other polarity output of said feedback power supply as an input to said D.C. amplifier only when said second flip-flop is in its set position.

References Cited in the file of this patent

UNITED STATES PATENTS

| | | |
|---|---|---|
| 2,836,356 | Forrest et al. | May 27, 1958 |
| 2,840,806 | Bateman | June 24, 1958 |
| 2,846,594 | Pankratz et al. | Aug. 5, 1958 |
| 2,867,695 | Buie | Jan. 6, 1959 |

OTHER REFERENCES

Bright, R. L.: Junction Transistors Used as Switches, Transaction AIEE, Part I, Communications and Electronics, vol. 74, No. 1, March 1955, pp. 111–121, pages 119–120 relied upon.